United States Patent
Zheng et al.

(10) Patent No.: US 12,061,647 B2
(45) Date of Patent: Aug. 13, 2024

(54) METHOD AND APPARATUS FOR LYRIC VIDEO DISPLAY, ELECTRONIC DEVICE, AND COMPUTER-READABLE MEDIUM

(71) Applicant: BEIJING ZITIAO NETWORK TECHNOLOGY CO., LTD., Beijing (CN)

(72) Inventors: Niwen Zheng, Beijing (CN); Jia Qu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 91 days.

(21) Appl. No.: 17/442,463

(22) PCT Filed: Jul. 15, 2021

(86) PCT No.: PCT/CN2021/106563
§ 371 (c)(1),
(2) Date: Sep. 23, 2021

(87) PCT Pub. No.: WO2022/105271
PCT Pub. Date: May 27, 2022

(65) Prior Publication Data
US 2022/0350840 A1 Nov. 3, 2022

(30) Foreign Application Priority Data
Nov. 18, 2020 (CN) .......................... 202011298977.8

(51) Int. Cl.
G06F 16/683 (2019.01)
H04N 21/431 (2011.01)

(52) U.S. Cl.
CPC ....... *G06F 16/685* (2019.01); *H04N 21/4316* (2013.01)

(58) Field of Classification Search
None
See application file for complete search history.

(56) References Cited

U.S. PATENT DOCUMENTS 8,978,075 B1 * 3/2015 Kaiser ................ H04N 21/4722
725/62
2003/0101364 A1 5/2003 Kim et al.
(Continued)

FOREIGN PATENT DOCUMENTS

CN 106227829 A 12/2016
CN 106446048 A 2/2017
(Continued)

OTHER PUBLICATIONS

International Patent Application No. PCT/CN2021/106563, International Search Report mailed Oct. 20, 2021, 4 pages.
(Continued)

*Primary Examiner* — Toan H Vu
(74) *Attorney, Agent, or Firm* — Faegre Drinker Biddle & Reath LLP (57) ABSTRACT

Provided are a method and an apparatus for lyric video display, an electronic device, and a computer-readable medium. The method includes: acquiring multimedia data to be displayed, the multimedia data including audio data and lyrics; determining a target time point, and acquiring a target lyric fragment corresponding to the target time point in the lyrics; and displaying the target lyric fragment in combination with a preset background, and playing a part of the audio data corresponding to the target lyric fragment.

14 Claims, 5 Drawing Sheets

(56) References Cited

U.S. PATENT DOCUMENTS

| | | | |
|---|---|---|---|
| 2005/0206751 A1* | 9/2005 | Manico | G11B 27/034 |
| | | | 352/85 |
| 2006/0248266 A1 | 11/2006 | Sun Kim et al. | |
| 2008/0091571 A1* | 4/2008 | Sater | G10H 1/0058 |
| | | | 705/26.5 |
| 2012/0315009 A1* | 12/2012 | Evans | H04N 21/4828 |
| | | | 386/230 |
| 2018/0041462 A1* | 2/2018 | Halt | H04L 51/10 |
| 2018/0374461 A1* | 12/2018 | Serletic | H04N 9/8211 |
| 2021/0029406 A1* | 1/2021 | Kumar | H04N 21/4542 |
| 2021/0055905 A1* | 2/2021 | Moldover | H04N 21/41407 |
| 2021/0191973 A1* | 6/2021 | Marchini | G06F 16/639 |
| 2021/0219039 A1* | 7/2021 | Robateau | G10H 1/365 |

FOREIGN PATENT DOCUMENTS

| | | | |
|---|---|---|---|
| CN | 106649586 A | 5/2017 | |
| CN | 107943964 A | 4/2018 | |
| CN | 109257499 A | 1/2019 | |
| CN | 109543064 A | 3/2019 | |
| CN | 110750675 A | 2/2020 | |
| CN | 111639226 A | 9/2020 | |
| CN | 111666445 A | 9/2020 | |
| CN | 111935537 A | 11/2020 | |
| CN | 112423107 A | 2/2021 | |

OTHER PUBLICATIONS

First Office Action issued Jan. 29, 2022 in Chinese Patent Application No. 202011298977.8 (8 pages) with an English translation (6 pages).

Notice of Decision of Granting Patent Right for Invention issued Apr. 15, 2022 in Chinese Patent Application No. 202011298977.8 (1 page) with English translation (2 pages).

First Examination Report issued Nov. 1, 2023 in Indian Patent Application No. 202127043170, with an English translation (6 pages).

First Office Action issued Sep. 15, 2023 in Indonesian Patent Application No. P00202107954, with an English translation (6 pages).

Extended European Search Report and Opinion issued Aug. 14, 2023 in European Patent Application No. 21893423.0 (14 pages).

* cited by examiner

METHOD AND APPARATUS FOR LYRIC VIDEO DISPLAY, ELECTRONIC DEVICE, AND COMPUTER-READABLE MEDIUM

This application is a U.S. 371 Application of International Patent Application No. PCT/CN2021/106563, filed on 15 Jul. 2021, which application claims the priority of the Chinese Patent Application No. 202011298977.8, titled "METHOD AND APPARATUS FOR LYRIC VIDEO DISPLAY, ELECTRONIC DEVICE, AND COMPUTER-READABLE MEDIUM" filed with the China National Intellectual Property Administration on Nov. 18, 2020, which applications are incorporated herein by reference in their entireties.

TECHNICAL FIELD

The present disclosure relates to the technical field of video processing, and more particularly, to a method and an apparatus for lyric video display, an electronic device and a computer-readable medium.

BACKGROUND

With the development of video technology, people have increasingly higher requirements on music videos, music lyrics appearing in music videos are very common now.

In existing music videos, lyrics can scroll or pan at the bottom of the video when playing music, and some technologies also have a function of coloring the lyrics. However, these are simply superimposing the lyrics with the videos. The entry and exit of the lyrics are both basic special effects, and the user experience is poor.

SUMMARY

Technical Problems

The present disclosure aims to solve at least one of the above technical defects, and particularly, to solve the technical problems in the prior art that the user experience effect is poor due to simple superposition of lyrics and video, and basic special effects of the entry and exit.

Technical Solutions

In a first aspect, a method for lyric video display is provided. The method includes: acquiring, based on a lyric video display operation of a user, multimedia data to be displayed, wherein the multimedia data includes audio data and lyrics; determining a target time point, and acquiring a target lyric fragment corresponding to the target time point in the lyrics; and displaying the target lyric fragment in combination with a preset background, and playing audio data corresponding to the target lyric fragment.

In a second aspect, an apparatus for lyrics video display is provided. The apparatus includes: a data acquisition module configured to acquire, based on a lyric video display operation of a user, multimedia data to be displayed, wherein the multimedia data includes audio data and lyrics; a lyric determining module configured to determine a target time point, and acquire a target lyric fragment corresponding to the target time point in the lyrics; and a lyric display module configured to display the target lyric fragment in combination with a preset background, and play audio data corresponding to the target lyric fragment.

In a third aspect, an electronic device is provided. The electronic device includes: one or more processors; a memory; and one or more applications. The one or more applications are stored in the memory and configured to be executed by the one or more processors, and the one or more applications are configured to implement the method for lyric video display described above.

In a fourth aspect, a computer-readable medium is provided. The computer-readable medium has at least one instruction, at least one program segment, a set of codes, or a set of instructions, which is stored on the computer-readable medium, and is loaded and executed by a processor to implement the method for lyric video display described above.

Beneficial Effects

According to embodiments of the present disclosure, the multimedia data to be displayed is acquired based on the lyric video display operation of a user, the target time point is determined, and the target lyric fragment corresponding to the target time point in the lyrics is acquired, and the target lyric fragment is displayed in combination with the preset background, while displaying the music. Through a substitution of the lyrics and the background, the users can be provided with a sense of lens movement and diversified presentations of lyrics.

BRIEF DESCRIPTION OF DRAWINGS

In order to more clearly illustrate the technical solutions in embodiments of the present disclosure, the drawings used in the description of the embodiments of the present disclosure will be briefly described below.

The above and other features, advantages, and aspects of the embodiments of the present disclosure will become more apparent with reference to the following detailed description in conjunction with the accompanying drawings. Throughout the drawings, the same or similar reference numbers represent the same or similar elements. It should be understood that the drawings are illustrative, and the elements and components are not necessarily drawn to scale.

DESCRIPTION OF EMBODIMENTS

Embodiments of the present disclosure will be described in more detail below with reference to the accompanying drawings. While some embodiments of the present disclosure are illustrated in the drawings, it should be understood that the present disclosure may be embodied in various forms and should not be construed as limitations on the embodiments set forth herein, but rather are provided for a more complete and thorough understanding of the present disclosure. It should be understood that the drawings and the embodiments of the present disclosure are for illustration purposes only and are not intended to limit the scope of the present disclosure.

It should be understood that various steps recited in embodiments of the method of the present disclosure may be performed in a different order, and/or performed in parallel. Moreover, the embodiments of the method may include additional steps and/or omit performing the illustrated steps. The scope of the present disclosure is not limited in this respect.

A term "including" and variations thereof as used herein are open-ended, i.e., "including, but not limited to". The term "based on" means "based at least in part on". The term "one embodiment" means "at least one embodiment"; the term "another embodiment" means "at least one additional embodiment"; the term "some embodiments" means "at least some embodiment". Relevant definitions for other terms will be given in the following description.

It should be noted that the terms "first", "second", and the like in the present disclosure are only used for distinguishing different apparatuses, modules, or units, and are not used for limiting the order or interdependence of the functions performed by the apparatuses, modules, or units.

It should be noted that term "a", "an", or "plurality of" in the present disclosure is illustrative rather than limiting, which shall be construed as "one or more" by that those skilled in the art, unless clearly indicated otherwise.

The names of messages or information exchanged between the apparatuses in the embodiments of the present disclosure are for illustrative purposes only, and are not intended to limit the scope of the messages or information.

The present disclosure provides a method and an apparatus for lyric video display, an electronic device, and a computer-readable medium, in order to solve the above technical problems in the prior art.

The following describes the technical solutions of the present disclosure and the way to solve the above technical problems in detail with specific embodiments. These specific embodiments may be combined with each other below, and details of the same or similar concepts or processes may not be elaborated in some embodiments. The embodiments of the present disclosure will be described below with reference to the accompanying drawings.

Figure 1:
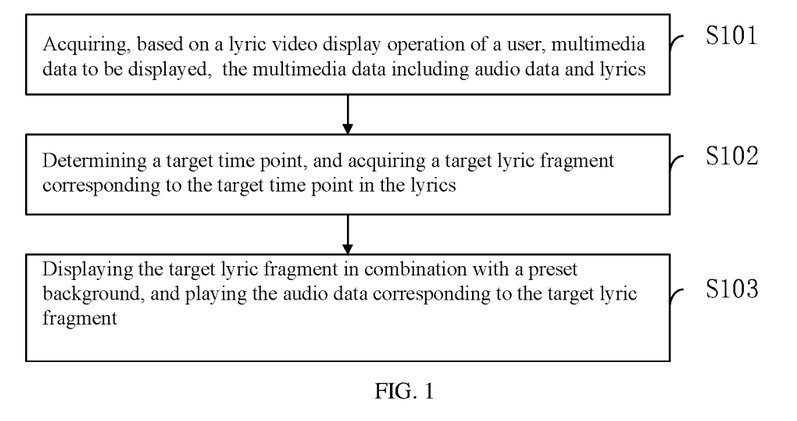
FIG. 1 is a flowchart illustrating a method for lyric video display according to an embodiment of the present disclosure.

The embodiments of the present disclosure provides a method for lyric video display, which may be applied in a user terminal. The method may be a function of an application (APP) in the user terminal, and may also be a function of a module in the APP, where an image data display apparatus and an audio data playing apparatus are provided in the application terminal. As illustrated in FIG. 1, the method includes the following steps.

In step S101, based on a lyric video display operation of a user, multimedia data to be displayed is acquired, where the multimedia data includes audio data and lyrics.

In step S102, a target time point is determined, and a target lyric fragment corresponding to the target time point in the lyrics is acquired.

In step S103, the target lyric fragment is displayed in combination with a preset background, and audio data corresponding to the target lyric fragment is played.

In the embodiments of the present disclosure, the multimedia data includes the audio data and the lyrics. The lyrics can be Chinese lyrics or lyrics in other languages. The target time point is a relative time point, relative to the starting point of multimedia data playing when the multimedia data is played. When the lyrics are displayed, the lyrics are displayed in combination with a preset background. The preset background is used for displaying the target lyric fragment, while playing the music corresponding to the target lyric fragment.

Figure 2:
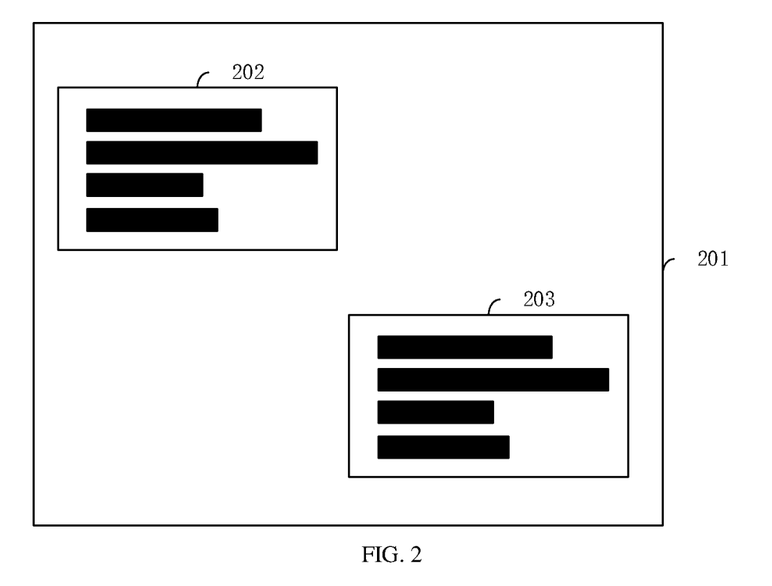
FIG. 2 is a schematic diagram illustrating a lyric fragment according to an embodiment of the present disclosure.
Figure 3:
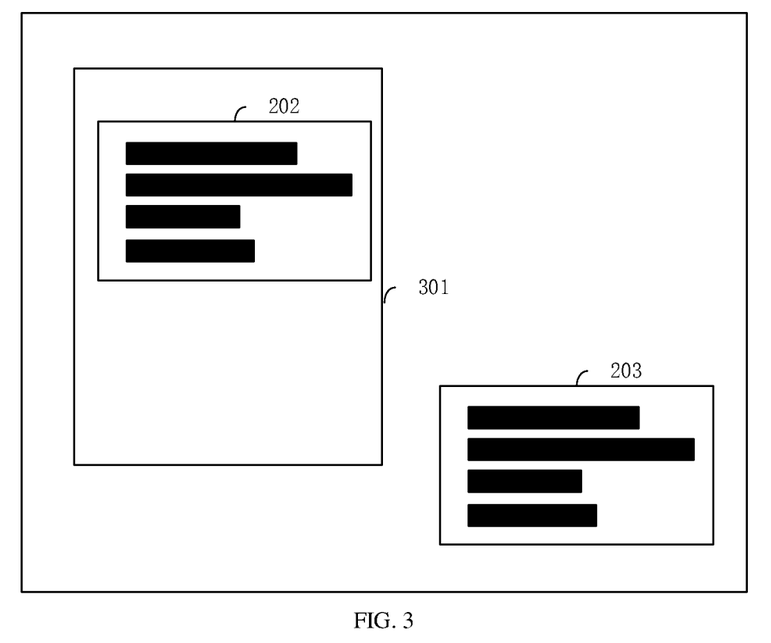
FIG. 3 is a schematic diagram illustrating a display region according to an embodiment of the present disclosure.
Figure 4:
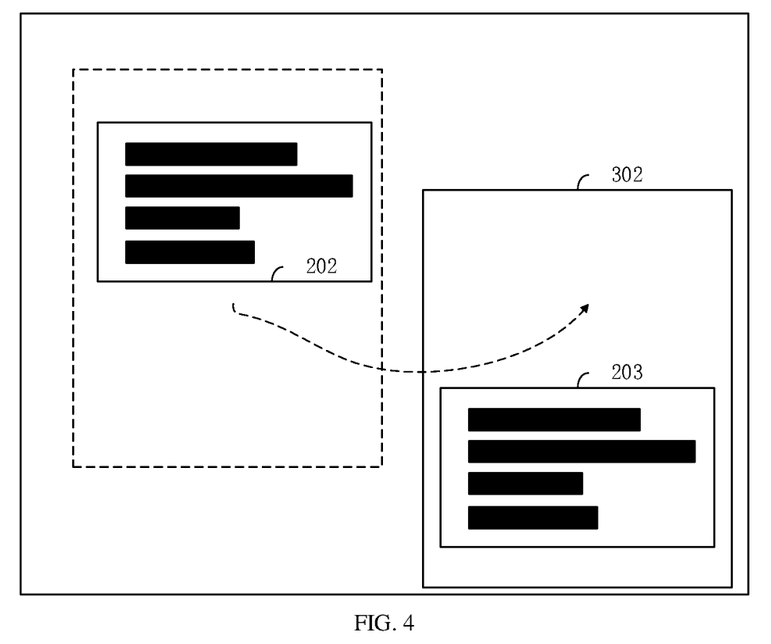
FIG. 4 is a schematic diagram illustrating a moving path of a display region according to an embodiment of the present disclosure.

As for the embodiments of the present disclosure, for convenience of description, taking one specific embodiment as an example, in which the multimedia data is music with lyrics, and the lyrics of the music are segmented. In some embodiments, the segmentation may be performed in accordance with the number of the lyrics. For example, a preset number of sentences is taken as one lyric segment. Alternatively, the lyrics may be segmented in accordance with the melody of the music. For example, a section of lyrics is taken as one lyric segment. The segmented lyrics are inserted into a background area. As illustrated in FIG. 2, there are a lyric segment 202 and a lyric segment 203 in the background area 201, a target time point is obtained. If the target time point is a starting time point for playing the lyric segment 202, the corresponding target lyric segment is the lyric segment 202. As illustrated in FIG. 3, the lyric segment 202 is to be displayed, then the lyric segment 202 is displayed in combination with a preset background 301 matching the lyric segment 202, the audio data corresponding to the lyric fragment 201 is played while displaying the lyric segment 202. When the obtained target time point is a starting time point for playing the lyric fragment 203, as illustrated in FIG. 4, the lyric fragment 203 is displayed in combination with a preset background 302 matching the lyric fragment 203, and the audio data corresponding to the lyric fragment 203 is played simultaneously. In some embodiments, in a transition between the lyric segment 202 and the lyric segment 203, an effect of lens movement can be achieved.

According to the embodiments of the present disclosure, the multimedia data to be displayed is acquired based on the lyric video display operation of the user, the target time point is determined, and the target lyric fragment corresponding to the target time point in the lyrics is acquired; and the target lyric fragment is displayed in combination with the preset background, and the music is played simultaneously. Through a substitution of the lyrics and the background, the users are provided with a sense of lens movement and diversified presentations of lyrics.

Figure 5:
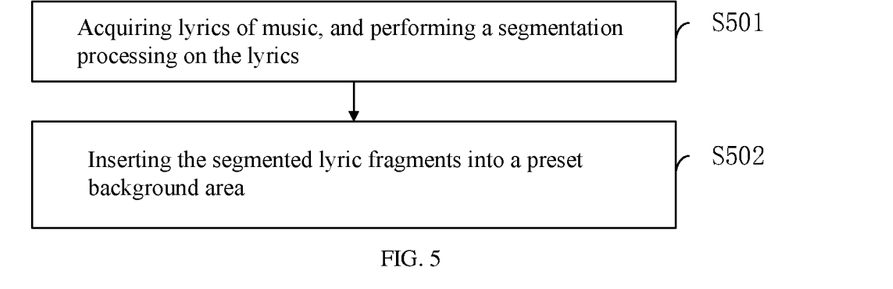
FIG. 5 is a flowchart illustrating a method for lyric segmentation according to an embodiment of the present disclosure.

In some embodiments, as illustrated in FIG. 5, prior to said acquiring the target lyric fragment corresponding to the target time point in the lyrics, the method further includes the following steps.

In step S501, lyrics of the music are acquired, and a segmentation processing is performed on the lyrics.

In step S502, the segmented lyric fragments are inserted into a preset background area.

In some embodiments, said performing the segmentation processing on the lyrics includes: performing the segmentation processing on the lyrics in accordance with a length of the lyrics; or performing the segmentation processing on the lyrics in accordance with sections of the lyrics.

In the embodiments of the present disclosure, prior to obtaining the target lyric fragment, the lyrics are required to be segmented. The lyrics can be segmented in accordance with the length of the lyrics; or the lyrics can be segmented in accordance with the sections of the lyrics. After the lyrics are segmented, the segmented lyric fragments are inserted into the preset background area. The position of each lyric fragment can be distributed in accordance with the content in the background area, and a preset background content can also be configured in the area near each lyric fragment. In this way, when the lyric fragment is displayed, the lyric fragment can be displayed in combination with the background corresponding to the lyric fragment.

According to the embodiment of the present disclosure, the segmentation processing is performed on the lyrics, and the segmented lyric fragments are inserted into the preset background area, so as to display the target lyric fragment in combination with the background.

In some embodiments, the background area includes a plurality of display regions, and one of the plurality of display regions corresponds to one target lyric fragment, and said displaying the target lyric fragment in combination with the preset background includes the following steps.

The plurality of display regions is switched in accordance with a playing sequence of the target lyric fragment, and through the plurality of display regions, the corresponding target lyric fragment and a background thereof are displayed.

In the embodiment of the present disclosure, the display region refers to a region for displaying in the background area. The background area has a plurality of display regions, one of the plurality of display regions is provided with one target lyric fragment, and the display region has a background content corresponding to the target lyric fragment in addition to the target lyric fragment corresponding thereto.

In some embodiments, in response to switching the target lyric fragment and the background thereof for displaying, a linkage between the backgrounds of two target lyric fragments that are successively displayed is controlled to present an effect of lens movement.

For the embodiment of the present disclosure, when the target lyric fragment is displayed, the plurality of display regions is switched in accordance with the playing sequence of the target lyric fragment, so that the target lyric fragment is displayed in combination with the background content matching the target lyric fragment through the display region. After the display of a current lyric fragment is completed, the target lyric fragment and the background content corresponding to the target lyric fragment can be switched and displayed by switching the display region. In some embodiments, the linkage can be existed between the backgrounds of two target lyric fragments that are successively displayed, and the background content exhibits an effect of lens movement during switching.

According to the embodiment of the present disclosure, the plurality of display regions is arranged in the background area, and the target lyric fragment and the background thereof are switched for displaying by switching the plurality of display regions, so that the effect of lens movement is presented between the background contents during the switching, and the users are provided with a better visual experience.

Figure 6:
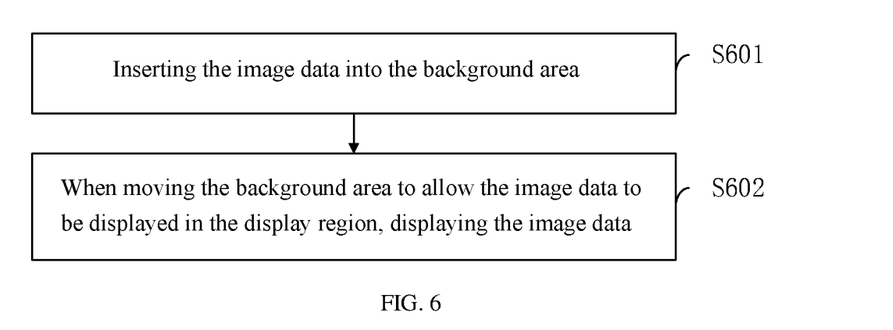
FIG. 6 is a flowchart illustrating an image data processing method according to an embodiment of the present disclosure.

In some embodiments, as illustrated in FIG. 6, the multimedia data further includes image data, and the method further includes the following steps.

In step S601, the image data is inserted into the background area.

In step S602, in response to switching the plurality of display regions to display the image data in one of the plurality of display regions, the image data is displayed.

In the embodiment of the present disclosure, the image data includes a video, an image, a motion picture, and the like, and the image data can be displayed while the lyrics are displayed.

In some embodiments, when inserting the image data into the background area, an insertion position of the image data is adjusted in accordance with an insertion position of the target lyric fragment.

Figure 7:
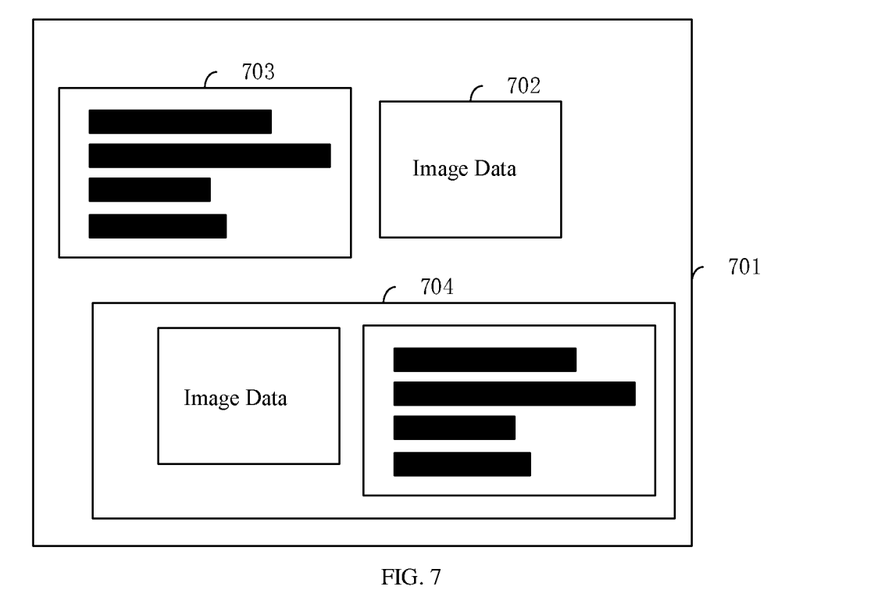
FIG. 7 is a schematic diagram illustrating an insertion of image data according to an embodiment of the present disclosure.

As for the embodiment of the present disclosure, for convenience of description, taking a specific embodiment as an example. As illustrated in FIG. 7, the multimedia data further includes the image data, and the image data 702 is also inserted into the background area 701. In some embodiments, the insertion position of the image data can be adjusted in accordance with the insertion position of the lyric fragment. For example, the insertion position of the image data is beside the lyric fragment. As illustrated in FIG. 7, the image data 702 is inserted around each lyric fragment 703. In an embodiment, the image data is displayed at the same time when the lyric fragment is displayed in the display region 704.

In the embodiment of the present disclosure, the multimedia data further includes the image data, the image data and the lyric fragments are inserted into the background area, the lyric fragments and the corresponding image areas are displayed at the same time, and an effect of lyric display is more diversified.

In some embodiment, said playing the video corresponding to the display region includes: displaying the video corresponding to the display region is played; and shielding audio information of the video.

In some embodiment, the image data is a motion picture, and said displaying the image data includes: displaying a motion picture corresponding to the display region.

In the embodiment of the present disclosure, if the image data is a video, the video is played while the image data is displayed; and if the image data is a motion picture, the motion picture is played while the image data is displayed. When a video is played, the audio information of the video can be selected to be shielded.

The video or the motion picture which is inserted in advance can be played while displaying the lyrics, and the effect of lyric display is richer.

Figure 8:
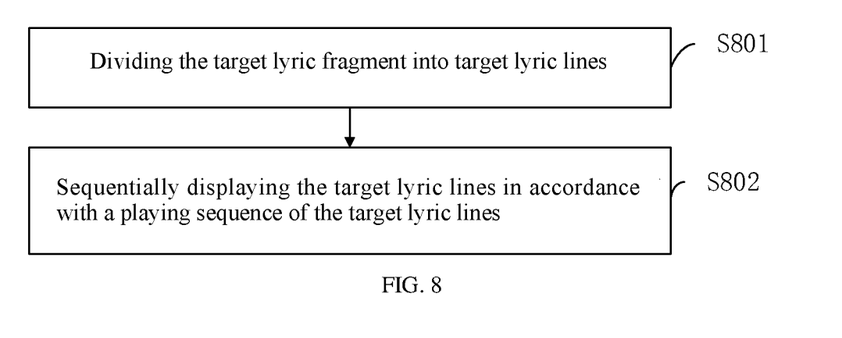
FIG. 8 is a flowchart illustrating a method for lyric fragment display according to an embodiment of the present disclosure.

In some embodiments, as illustrated in FIG. 8, said displaying the target lyric fragment includes the following steps.

In step S801, the target lyric fragment is divided into lines to obtain a plurality of target lyric lines.

In step S802, the plurality of target lyric lines is sequentially displayed in accordance with a playing sequence of the plurality of target lyric lines.

In the embodiment of the present disclosure, when displaying the target lyric fragment, the target lyric fragment may be selected to be divided into lines. For example, a sentence of lyrics may be divided as a line. When the lyrics are divided into the plurality of lines, the lyrics may be displayed sequentially in accordance with the playing sequence of the plurality of lyrics lines when the lyrics are displayed.

Figure 9:
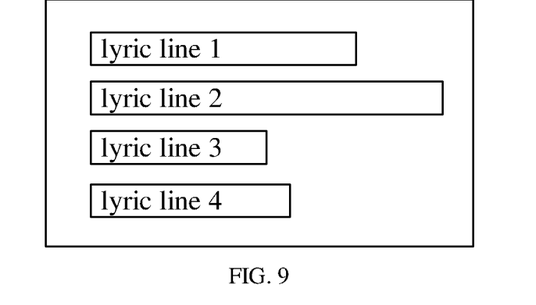
FIG. 9 is a schematic diagram illustrating a lyric line according to an embodiment of the present disclosure.

As for the embodiment of the present disclosure, for convenience of description, a specific embodiment is taken as an example. As illustrated in FIG. 9, a target lyric fragment is divided into lines to obtain 4 lyric lines, and further, when displaying the lyrics, the lyric lines 1, 2, 3, and 4 are played sequentially. In an embodiment, when displaying the following lyric lines, the previously displayed lyric lines can be retained. For example, for each line of lyrics, the entire line of lyrics may be optionally displayed a form of a single lyric occurrence when displayed.

According to the embodiment of the present disclosure, the target lyric fragment is divided into lines, and the plurality of lyric lines is sequentially displayed in accordance with the playing sequence of the lyric lines, so that the display of the lyrics is synchronous with music, and thus the users can view the lyrics with a stronger pertinence.

Figure 10:
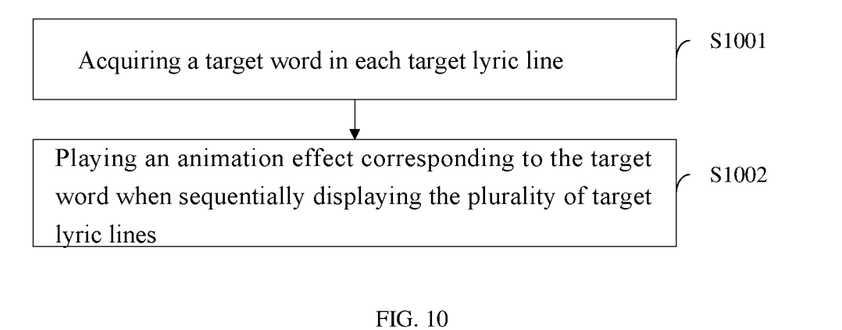
FIG. 10 is a flowchart illustrating a method for target lyric display according to an embodiment of the present disclosure.

In some embodiments, as illustrated in FIG. 10, said sequentially displaying the plurality of target lyric lines includes the following steps.

In step S1001, a target word in each of the plurality of target lyric lines is acquired.

In step S1002, an animation effect corresponding to the target word is played when sequentially displaying the plurality of target lyric lines.

In the embodiment of the present disclosure, the target word refers to the lyrics to which a special effect needs to be added, and the target word may be predetermined or determined based on the content of the lyric.

As for the embodiment of the present disclosure, for convenience of description, as an example, the target word in each lyric lines is acquired, the lyrics are displayed in such a manner that the individual words are displayed, and when the target word is displayed, the animation effect corresponding to the target word is played. In some embodiments, the animation effect may be a preset small sticker animation, such as appearance of heart shape, or an animation for labeling a lyric, such as drawing a circle surrounding the target word, underlining the target word, etc.

According to the embodiment of the present disclosure, by adding the animation effect to the target word, the lyrics have more presentation forms during the display, and the lyrics display is more interesting.

In some embodiments, said displaying the target lyric fragment further includes: displaying the target lyric fragment in a preset display font. The display font includes a handwriting font.

In the embodiment of the present disclosure, when displaying the lyrics, the lyrics can be selected to be displayed in the preset display font, such as the handwriting font. In some embodiments, in the process of displaying the lyrics, the display process of the lyrics can be presented in a handwriting animation manner, for example, the lyrics are displayed in accordance with a stroke sequence of the handwriting font.

In the embodiment of the present disclosure, by displaying he lyrics in the preset font, the lyrics display can provide a feeling of handwriting, and better artistic conception.

According to the embodiment of the present disclosure, the lyrics are segmented, the segmented lyrics are inserted into the background area, the target time point is obtained, the target lyric segment at the target time point is determined, and the target lyric segment is displayed by moving the display area according to the preset path and the music is displayed at the same time, thereby providing the users with a feeling of camera movement, and diversified presentations of the lyrics.

Figure 11:
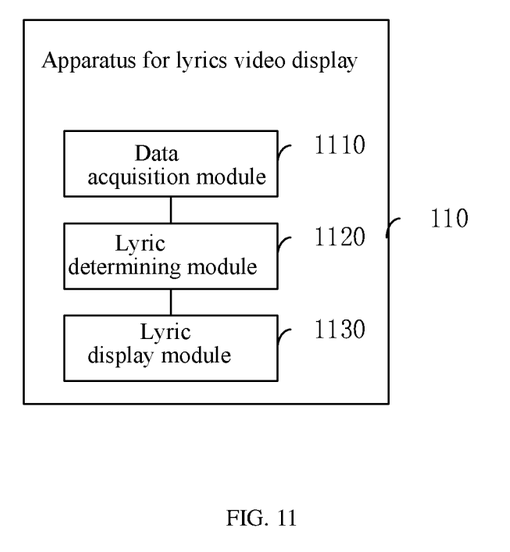
FIG. 11 is a schematic diagram illustrating an apparatus for lyrics video display according to an embodiment of the present disclosure.

The embodiments of the present disclosure provide an apparatus for lyrics video display. As illustrated in FIG. 11, the apparatus 110 for lyrics video display may include a data acquisition module 1110, a lyric determining module 1120, and a lyric display module 1130.

The data acquisition module 1110 is configured to acquire, based on a lyric video display operation of a user, multimedia data to be displayed. The multimedia data includes audio data and lyrics.

The lyric determining module 1120 is configured to determine a target time point, and acquire a target lyric fragment corresponding to the target time point in the lyrics.

The lyric display module 1130 is configured to display the target lyric fragment in combination with a preset background, and play audio data corresponding to the target lyric fragment.

In some embodiments, the apparatus 110 for lyrics video display further includes a lyric segmentation module configured to: acquire lyrics of music, and perform a segmentation processing on the lyrics; and insert the segmented lyric fragments into a preset background area.

In some embodiments, the segmentation processing on the lyrics performed by the lyric segmentation module specifically includes: the segmentation processing of the lyrics in accordance with a length of the lyrics; or the segmentation processing of the lyrics in accordance with sections of the lyrics.

In some embodiments, the background area includes a plurality of display regions, and one display region corresponds to one target lyric fragment. When the target lyric fragment is displayed in combination with the preset background, the lyric display module 1130 can be configured to switch the display regions in accordance with a playing sequence of the target lyric fragment, and display, through the plurality of display regions, the corresponding target lyric fragment and a background thereof.

In some embodiments, the lyric display module 1130 is further configured to control a linkage between the backgrounds of two target lyric fragments that are successively displayed to present an effect of lens movement, in response to switching the target lyric fragment and the background thereof for displaying.

In some embodiments, the multimedia data further includes image data, and the apparatus 110 for lyrics video display further includes a display switching module. The display switching module is configured to insert the image data into the background area, and display the image data in response to switching the display regions to display the image data in one display region.

In some embodiments, when the display switching module inserts the image data into the background area, the display switching module may further be configured to adjust an insertion position of the image data in accordance with an insertion position of the target lyric fragment.

In some embodiments, the image data is a video, and when the lyric display module 1130 displays the image data, the lyric display module 1130 may be configured to play the video corresponding to the display region.

In some embodiments, when the lyric display module 1130 displays the image data, the lyric display module 1130 may be configured to play the video corresponding to the display region, and shield audio information of the video.

In some embodiments, the image data is a motion picture, and when the lyric display module 1130 displays the image data, the lyric display module 1130 may be configured to play a motion picture corresponding to the display region.

In some embodiments, when the lyric display module 1130 displays the target lyric fragment in combination with the preset background, the lyric display module 1130 may be configured to divide the target lyric fragment into a plurality of target lyric lines; and sequentially display the plurality of target lyric lines in accordance with a playing sequence of the plurality of target lyric lines.

In some embodiments, when the lyric display module 1130 sequentially displays the plurality of target lyric lines, the lyric display module 1130 may be configured to acquire a target word in each target lyric line; and play an animation effect corresponding to the target word when sequentially displaying the plurality of target lyric lines.

In some embodiments, when the lyric display module 1130 displays the target lyric fragment, the lyric display module 1130 may be configured to display the target lyric fragment in a preset display font. The display font includes a handwriting font.

According to embodiments of the present disclosure, the multimedia data to be displayed is acquired based on the lyric video display operation of the user, the target time point is determined, and the target lyric fragment corresponding to the target time point in the lyrics is acquired; and the target lyric fragment is displayed in combination with the preset background, and the music is played simultaneously. Through a substitution of the lyrics and the background, the users are provided with a sense of lens movement and diversified presentations of lyrics.

Figure 12:
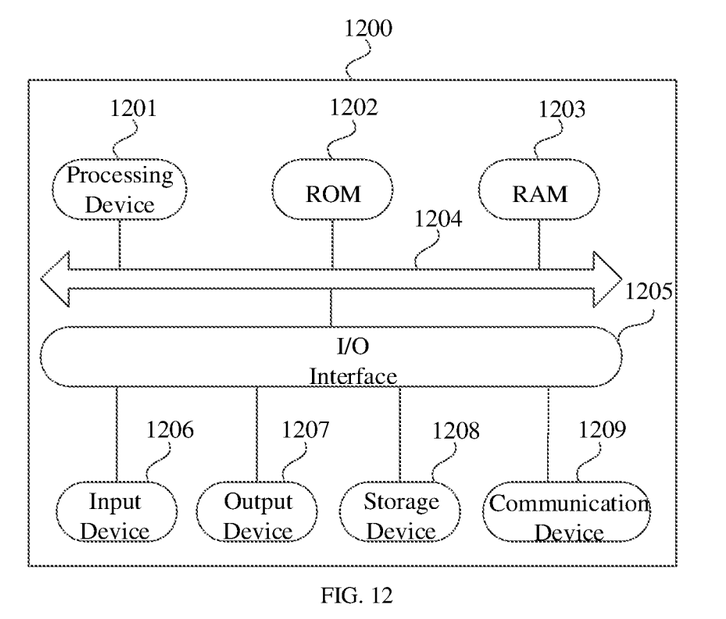
FIG. 12 is a schematic diagram illustrating an electronic device according to an embodiment of the present disclosure.

FIG. 12 is a schematic diagram illustrating an electronic device 1200 adapted to implement the embodiments of the present disclosure. The terminal device according to the embodiment of the present disclosure may include, but not limited to, a mobile terminal such as a mobile phone, a laptop computer, a digital broadcast receiver, a Personal Digital Assistant (PDA), a tablet computer or PAD, a Portable Multimedia Player (PMP), or a vehicle-mounted terminal (e.g., a vehicle-mounted navigation terminal), or a fixed terminal such as a digital TV, a desktop computer, etc. The electronic device illustrated in FIG. 12 is exemplary only, and should not be construed as limiting the function and scope of use of the embodiments of the present disclosure.

The electronic device includes a memory and a processor. The processor herein may be referred to as a processing device 1201 hereinafter, and the memory may include at least one of the Read Only Memory (ROM) 1202, the Random Access Memory (RAM) 1203, and the storage device 1208, which are described in detail as follows.

As illustrated in FIG. 12, the electronic device 1200 may include a processing device 1201 (e.g., a central processing unit, a graphics processor, etc.), which may perform various appropriate actions and processes in accordance with programs stored in a Read Only Memory (ROM) 1202 or loaded from a storage device 1208 into a Random Access Memory (RAM) 1203. Various programs and data required for operation of the electronic device 1200 may also be stored on the RAM 1203. The processing device 1201, the ROM 1202, and the RAM 1203 are connected to each other through a bus 1204. An input/output (I/O) interface 1205 is also connected to bus 1204.

Generally, the following devices may be connected to the I/O interface 1205: an input devices 1206 including, for example, a touch screen, a touch pad, a keyboard, a mouse, a camera, a microphone, an accelerometer, a gyroscope, etc.; an output device 1207 including, for example, a Liquid Crystal Display (LCD), a speaker, a vibrator, and the like; a storage device 1208 including, for example, magnetic tape, hard disk, etc.; and a communication device 1209. The communication device 1209 may allow the electronic apparatus 1200 to perform wireless or wired communication with other devices for data exchange. Although FIG. 12 illustrates the electronic device 1200 having various means, it can be appreciated that it is not necessary to implement or provide all the illustrated devices. Alternatively, more or fewer devices may be implemented or provided.

In particular, according to an embodiment of the present disclosure, the processes described above with reference to the flowcharts may be implemented as computer software programs. For example, an embodiment of the present disclosure includes a computer program product, which includes a computer program carried on a computer-readable medium. The computer program includes program codes for implementing the method illustrated in any of the flowcharts. In these embodiments, the computer program may be downloaded and installed from a network through the communication device 1209, or installed from the storage device 1208, or installed from the ROM 1202. When the computer program is executed by the processing device 1201, the above-mentioned functions defined in the methods according to the embodiments of the present disclosure are performed.

It is to be noted that the above computer-readable medium in the present disclosure may be a computer-readable signal medium or a computer-readable storage medium or any combination thereof. The computer-readable storage medium may be, but not limited to, for example, an electrical, magnetic, optical, electromagnetic, infrared, or semi-conductor system, apparatus, or device, or any combination thereof. More specific examples of the computer-readable storage medium may include, but not limited to: an electrical connection having one or more wires, a portable computer disk, a hard disk, a Random Access Memory (RAM), a Read Only Memory (ROM), an Erasable Programmable Read Only Memory (EPROM) or a flash memory, an optical fiber, a Compact Disc Read-Only Memory (CD-ROM), an optical memory device, a magnetic memory device, or any suitable combination thereof. In the present disclosure, the computer-readable storage medium may be any tangible medium including or storing programs, which may be used by or used with an instruction execution system, apparatus, or device. However, in the present disclosure, the computer-readable signal medium may include a data signal propagated in a baseband or as a part of a carrier that carries computer-readable program codes. Such propagated data signal may be in various forms, including but not limited to an electromagnetic signal, an optical signal, or any suitable combination thereof. The computer-readable signal medium may be any computer-readable medium other than the computer-readable storage medium, which may transmit, propagate, or transfer programs used by or used with an instruction execution system, apparatus or device. The program codes contained on the computer-readable medium may be transmitted via any appropriate medium, including but not limited to electric cable, optical cable, Radio Frequency (RF), or any suitable combination thereof.

In some embodiments, the client and the server may communicate using any currently known or future-developed network protocol, such as HTTP (HyperText Transfer Protocol), and may be in communication interconnection with digital data in any form or medium (e.g., a communication network). Examples of communication networks include a Local Area Network ("LAN"), a Wide Area Network ("WAN"), the Internet work (e.g., the Internet), and an end-to-end network (e.g., ad hoc end-to-end network), as well as any currently known or future-developed network.

The above-mentioned computer readable medium may be contained in the above-mentioned electronic device, or it may be separated and not assembled into the electronic device.

The above-mentioned computer readable medium carries one or more programs which, when executed by the electronic device, cause the electronic device to: acquire, based on a lyric video display operation of a user, multimedia data to be displayed, where the multimedia data includes audio data and lyrics; determine a target time point, and acquire a target lyric fragment corresponding to the target time point in the lyrics; and display the target lyric fragment in combination with a preset background, and play audio data corresponding to the target lyric fragment.

The computer program codes for implementing the operations according to the embodiments of the present disclosure may be written in one or more programming languages or any combination thereof. The programming languages may include object-oriented programming languages, such as Java, Smalltalk, or C++, as well as conventional procedure-oriented programming languages, such as "C" language or similar programming languages. The program codes may be executed completely on a user computer, partly on the user computer, as a standalone software package, partly on the user computer and partly on a remote computer, or completely on the remote computer or server. In a case where the remote computer is involved, the remote computer may be connected to the user computer through any types of network, including a Local Area Network (LAN) or a Wide Area Network (WAN), or to an external computer (e.g., over the Internet by using an Internet service provider).

The flowcharts and block diagrams in the accompanying drawings illustrate architectures, functions, and operations of possible implementations of systems, methods, and computer program products according to various embodiments of the present disclosure. In this regard, each block in the flowcharts or block diagrams may represent a module, a program segment, or a part of codes. The module, program segment, or part of codes may contain one or more executable instructions for implementing a specified logical function. It should also be noted that, in some alternative implementations, the functions showed in blocks may occur in an order other than the order illustrated in the drawings. For example, two blocks illustrated in succession may actually be executed substantially in parallel with each other, or sometimes even in a reverse order, depending on functions involved. It should also be noted that each block in the block diagrams and/or flowcharts, or any combination of the blocks in the block diagrams and/or flowcharts, may be implemented using a dedicated hardware-based system configured to perform specified functions or operations or may be implemented using a combination of dedicated hardware and computer instructions.

The modules or units described in the embodiments of the present disclosure may be embodied as software or hardware.

The functions described herein above may be performed, at least in part, by one or more hardware logic components. For example, without limitation, exemplary types of suitable hardware logic components include a Field Programmable Gate Array (FPGA), an Application Specific Integrated Circuit (ASIC), an Application Specific Standard Product (ASSP), a System on Chip (SOC), a Complex Programmable Logic Device (CPLD), and the like.

In the context of this disclosure, a machine-readable medium may be a tangible medium, which may contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of a machine-readable storage medium would include an electrical connection having one or more wires, a portable computer disk, a hard disk, a Random Access Memory (RAM), a Read Only Memory (ROM), an Erasable Programmable Read Only Memory (EPROM) or flash memory, an optical fiber, a Compact Disc Read Only Memory (CD-ROM), an optical memory device, a magnetic memory device, or any suitable combination thereof.

According to one or more embodiments of the present disclosure, a method for lyric video display is provided. The method includes: acquiring, based on a lyric video display operation of a user, multimedia data to be displayed, where the multimedia data includes audio data and lyrics; determining a target time point, and acquiring a target lyric fragment corresponding to the target time point in the lyrics; and displaying the target lyric fragment in combination with a preset background, and playing audio data corresponding to the target lyric fragment.

In some embodiments, prior to said acquiring the target lyric fragment corresponding to the target time point in the lyrics, the method further includes: acquiring lyrics of music, and performing a segmentation processing on the lyrics; and inserting the segmented lyric fragments into a preset background area.

In some embodiments, said performing the segmentation processing on the lyrics includes: performing the segmentation processing on the lyrics in accordance with a length of the lyrics; or performing the segmentation processing on the lyrics in accordance with sections of the lyrics.

In some embodiments, the background area includes a plurality of display regions, and one of the plurality of display regions corresponds to one target lyric fragment, and said displaying the target lyric fragment in combination with the preset background includes: switching the plurality of display regions in accordance with a playing sequence of the target lyric fragment, and displaying, through the plurality of display regions, the corresponding target lyric fragment and a background thereof.

In some embodiments, the method further includes: in response to switching the target lyric fragment and the background thereof for displaying, controlling a linkage between the backgrounds of two target lyric fragments that are successively displayed to present an effect of lens movement.

In some embodiments, the multimedia data further includes image data, and the method further includes: inserting the image data into the background area; and in response to switching the plurality of display regions to display the image data in one of the plurality of display regions, displaying the image data.

In some embodiments, when inserting the image data into the background area, the method further includes: adjusting an insertion position of the image data in accordance with an insertion position of the target lyric fragment.

In some embodiments, the image data is a video, and said displaying the image data includes: playing the video corresponding to the display region.

In some embodiments, said playing the video corresponding to the display region includes: playing the video corresponding to the display region, and shielding audio information of the video.

In some embodiments, the image data is a motion picture, and said displaying the image data includes: playing a motion picture corresponding to the display region.

In some embodiments, said displaying the target lyric fragment in combination with the preset background includes: dividing the target lyric fragment into a plurality of target lyric lines; and sequentially displaying the plurality of target lyric lines in accordance with a playing sequence of the plurality of target lyric lines.

In some embodiments, said sequentially displaying the plurality of target lyric lines includes: acquiring a target word in each of the plurality of target lyric lines; and playing an animation effect corresponding to the target word when sequentially displaying the plurality of target lyric lines.

In some embodiments, said displaying the target lyric fragment further includes: displaying the target lyric fragment in a preset display font including a handwriting font.

According to one or more embodiments of the present disclosure, an apparatus for lyric video display is provided. The apparatus includes: a data acquisition module configured to acquire, based on a lyric video display operation of a user, multimedia data to be displayed, wherein the multimedia data includes audio data and lyrics; a lyric determining module configured to determine a target time point, and acquire a target lyric fragment corresponding to the target time point in the lyrics; and a lyric display module configured to display the target lyric fragment in combination with a preset background, and play the audio data corresponding to the target lyric fragment.

In some embodiments, the apparatus for lyrics video display further includes a lyric segmentation module configured to acquire lyrics of music, and perform a segmentation processing on the lyrics; and insert the segmented lyric fragments into a preset background area.

In some embodiments, the segmentation processing on the lyrics performed by the lyric segmentation module specifically includes the segmentation processing of the lyrics in accordance with a length of the lyrics, or the segmentation processing of the lyrics in accordance with sections of the lyrics.

In some embodiments, the background area includes a plurality of display regions, and one of the plurality of display regions corresponds to one target lyric fragment, and when the lyric display module displays the target lyric fragment in combination with the preset background, the lyric display module may be configured to switch the plurality of display regions in accordance with a playing sequence of the target lyric fragment, and display, through the plurality of display regions, the corresponding target lyric fragment and a background thereof.

In some embodiments, in response to switching the target lyric fragment and the background thereof for displaying, the lyric display module is further configured to control a linkage between the backgrounds of two target lyric fragments that are successively displayed to present an effect of lens movement.

In some embodiments, the multimedia data further includes image data, and the apparatus for lyrics video display further includes a display switching module. The display switching module is configured to insert the image data into the background area; and display the image data in response to switching the plurality of display regions to display the image data in one of the plurality of display regions.

In some embodiments, when the display switching module inserts the image data into the background area, the display switching module may further be configured to adjust an insertion position of the image data in accordance with an insertion position of the target lyric fragment.

In some embodiments, the image data is a video, and when the lyric display module displays the image data, the lyric display module may be configured to play the video corresponding to the display region.

In some embodiments, when the lyric display module displays the image data, the lyric display module may be configured to play the video corresponding to the display region, and shield audio information of the video.

In some embodiments, the image data is a motion picture, and when the lyric display module displays the image data, the lyric display module may be configured to play a motion picture corresponding to the display region.

In some embodiments, when the lyric display module displays the target lyric fragment in combination with the preset background, the lyric display module may be configured to divide the target lyric fragment into a plurality of target lyric lines; and sequentially display the plurality of target lyric lines in accordance with a playing sequence of the plurality of target lyric lines.

In some embodiments, when the lyric display module sequentially displays the plurality of target lyric lines, the lyric display module may be configured to acquire a target word in each of the plurality of target lyric lines; and play an animation effect corresponding to the target word when sequentially displaying the plurality of target lyric lines.

In some embodiments, when the lyric display module displays the target lyric fragment, the lyric display module may be configured to display the target lyric fragment in a preset display font including a handwriting font.

According to one or more embodiments of the present disclosure, an electronic device is provided. The electronic device includes one or more processors, a memory, and one or more applications. The one or more applications are stored in the memory and configured to be executed by the one or more processors, the one or more applications are configured to implement the method for lyric video display described above.

According to one or more embodiments of the present disclosure, there is provided a computer-readable medium having stored thereon at least one instruction, at least one program segment, a set of codes, or a set of instructions, which are loaded and executed by a processor to implement the method for lyric video display described above.

The above description is only intended to explain the preferred embodiments of the present disclosure and the employed principles of the technology. It will be appreciated by those skilled in the art that the scope of the present disclosure herein is not limited to t the technical solutions formed by the specific combination of the above technical features, but should also encompass any other combinations of features described above or equivalents thereof without departing from the above concept of the present disclosure. For example, the above features and the technical features disclosed in the present disclosure having similar functions (but not limited to them) are replaced with each other to form the technical solution.

Further, although the operations are depicted in a specific order, this should not be understood as requiring these operations to be performed in the specific order illustrated or in a sequential order. Under certain circumstances, multitasking and parallel processing may be advantageous. Likewise, although several specific implementation details are included in the above discussion, these should not be construed as limitations on the scope of the present disclosure. Certain features that are described in the context of separate embodiments can also be implemented in combination in a single embodiment. Conversely, various features described in the context of a single embodiment can also be implemented in multiple embodiments separately or in any suitable combination.

Although the subject matter has been described in language specific to structural features and/or logical actions of the method, it should be understood that the subject matter defined in the appended claims is not necessarily limited to the specific features or actions described above. On the contrary, the specific features and actions described above are merely exemplary forms of implementing the claims.

What is claimed is:

1. A method for lyric video display, comprising:
   acquiring, based on a lyric video display operation of a user, multimedia data to be displayed, wherein the multimedia data comprises audio data and lyrics;
   determining a target time point, and acquiring a target lyric fragment corresponding to the target time point in the lyrics; and
   displaying the target lyric fragment in combination with a preset background, and playing audio data corresponding to the target lyric fragment, wherein
   the method further comprises, prior to said acquiring the target lyric fragment corresponding to the target time point in the lyrics:
   acquiring lyrics of music, and performing a segmentation processing on the lyrics; and
   inserting the segmented lyric fragments into a preset background area.

2. The method according to claim 1, wherein said performing the segmentation processing on the lyrics comprises:
   performing the segmentation processing on the lyrics in accordance with a length of the lyrics; or
   performing the segmentation processing on the lyrics in accordance with sections of the lyrics.

3. The method according to claim 1, wherein the background area comprises a plurality of display regions, and one of the plurality of display regions corresponds to one target lyric fragment, and wherein said displaying the target lyric fragment in combination with the preset background comprises:
   switching the plurality of display regions in accordance with a playing sequence of the target lyric fragment, and displaying, through the plurality of display regions, the corresponding target lyric fragment and a background thereof.

4. The method according to claim 3, further comprising:
   in response to switching the target lyric fragment and the background thereof for displaying, controlling a linkage between the backgrounds of two target lyric fragments that are successively displayed to present an effect of lens movement.

5. The method according to claim 3, wherein the multimedia data further comprises image data, and the method further comprises:
   inserting the image data into the background area; and
   in response to switching the plurality of display regions to display the image data in one of the plurality of display regions, displaying the image data.

6. The method according to claim 5, further comprising, when inserting the image data into the background area:
   adjusting an insertion position of the image data in accordance with an insertion position of the target lyric fragment.

7. The method according to claim 5, wherein the image data is a video, and wherein said displaying the image data comprises:
   playing the video corresponding to the display region.

8. The method according to claim 7, wherein said playing the video corresponding to the display region comprises:
   playing the video corresponding to the display region, and shielding audio information of the video.

9. The method according to claim 5, wherein the image data is a motion picture, and wherein said displaying the image data comprises:
   playing a motion picture corresponding to the display region.

10. The method according to claim 1, wherein said displaying the target lyric fragment in combination with the preset background comprises:
    dividing the target lyric fragment into a plurality of target lyric lines; and
    sequentially displaying the plurality of target lyric lines in accordance with a playing sequence of the plurality of target lyric lines.

11. The method according to claim 10, wherein said sequentially displaying the plurality of target lyric lines comprises:
    acquiring a target word in each of the plurality of target lyric lines; and
    playing an animation effect corresponding to the target word when sequentially displaying the plurality of target lyric lines.

12. The method according to claim 1, wherein said displaying the target lyric fragment further comprises:
    displaying the target lyric fragment in a preset display font comprising a handwriting font.

13. An electronic device, comprising:
    one or more processors;
    a memory; and
    one or more applications,
    wherein the one or more applications are stored in the memory and configured to be executed by the one or more processors, the one or more applications are configured to implement the method for lyric video display according to claim 1.

14. A computer-readable medium having at least one instruction, at least one program segment, a set of codes, or a set of instructions that is stored on the computer-readable medium, and is loaded and executed by a processor to implement the method for lyric video display according to claim 1.

* * * * *